United States Patent
Inoue

(10) Patent No.: US 8,813,476 B2
(45) Date of Patent: Aug. 26, 2014

(54) DIAGNOSIS APPARATUS FOR REDUCING AGENT SUPPLY APPARATUS

(75) Inventor: Mikio Inoue, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 958 days.

(21) Appl. No.: 12/989,500

(22) PCT Filed: Apr. 17, 2009

(86) PCT No.: PCT/JP2009/057776
§ 371 (c)(1),
(2), (4) Date: Oct. 25, 2010

(87) PCT Pub. No.: WO2009/131071
PCT Pub. Date: Oct. 29, 2009

(65) Prior Publication Data
US 2011/0036072 A1 Feb. 17, 2011

(30) Foreign Application Priority Data

Apr. 25, 2008 (JP) ................. 2008-115317

(51) Int. Cl.
| | | |
|---|---|---|
| *F01N 3/00* | (2006.01) | |
| *B01D 53/90* | (2006.01) | |
| *F01N 11/00* | (2006.01) | |
| *F01N 3/20* | (2006.01) | |
| *B01D 53/94* | (2006.01) | |

(52) U.S. Cl.
CPC ............... *F01N 11/002* (2013.01); *Y02T 10/24* (2013.01); *F01N 2900/1811* (2013.01); *B01D 53/90* (2013.01); *F01N 2550/05* (2013.01); *B01D 2251/2067* (2013.01); *F01N 2240/20* (2013.01); *F01N 2560/06* (2013.01); *F01N 2610/02* (2013.01); *Y02T 10/47* (2013.01); *F01N 2900/1404* (2013.01); *F01N 2900/0416* (2013.01); *F01N 3/2066* (2013.01); *B01D 53/9409* (2013.01); *F01N 2900/1806* (2013.01)
USPC ................. 60/277; 60/286; 60/295

(58) Field of Classification Search
USPC .................................... 60/272–324
See application file for complete search history.

(56) References Cited

U.S. PATENT DOCUMENTS 6,367,320 B1 * 4/2002 Kueper et al. .............. 73/114.71
(Continued)

FOREIGN PATENT DOCUMENTS

| EP | 1 055 449 A1 | 11/2000 |
|---|---|---|
| JP | 11 62686 | 3/1999 |

(Continued)

OTHER PUBLICATIONS

International Search Report issued Jun. 30, 2009 in PCT/JP09/57776 filed Apr. 17, 2009.

*Primary Examiner* — Thomas Denion
*Assistant Examiner* — Anthony Ayala Delgado
(74) *Attorney, Agent, or Firm* — Oblon, Spivak, McClelland, Maier & Neustadt, L.L.P.

(57) ABSTRACT

An apparatus determines whether or not there is a malfunction in a reducing agent supply apparatus having a reducing agent addition valve provided in the exhaust system of an internal combustion engine. The reducing agent addition valve injects liquid reducing agent into the exhaust gas. A temperature sensing unit that senses the temperature of the exhaust gas is provided at a position in the exhaust system of the internal combustion engine through which the reducing agent injected through the reducing agent addition valve passes. As the reducing agent is injected through the reducing agent addition valve, the temperature decrease of the exhaust gas at the position through which the reducing agent passes is calculated by a temperature decrease calculation unit. Whether or not there is a malfunction in the reducing agent supply apparatus is determined by a diagnosis unit, based on the temperature decrease of the exhaust gas.

5 Claims, 6 Drawing Sheets

(56) References Cited

U.S. PATENT DOCUMENTS

| | | | |
|---|---|---|---|
| 8,061,123 B2* | 11/2011 | Driscoll et al. | 60/286 |
| 2006/0236681 A1* | 10/2006 | Masuda et al. | 60/286 |
| 2008/0034742 A1* | 2/2008 | Shibata et al. | 60/301 |
| 2009/0158709 A1 | 6/2009 | Masuda et al. | |

FOREIGN PATENT DOCUMENTS

| | | |
|---|---|---|
| JP | 11-270329 A | 10/1999 |
| JP | 2005 273549 | 10/2005 |
| JP | 2007 64112 | 3/2007 |
| JP | 2009 127497 | 6/2009 |

* cited by examiner

DIAGNOSIS APPARATUS FOR REDUCING AGENT SUPPLY APPARATUS

This application is the national phase application under 35 U.S.C. §371 of PCT international application No. PCT/JP2009/057776 filed on 17 Apr. 2009, which claims priority to Japanese patent application No. 2008-115317 filed on 25 Apr. 2008, the contents of which are incorporated herein by reference.

TECHNICAL FIELD

The present invention relates to a diagnosis apparatus for diagnosing a reducing agent supply apparatus having a reducing agent addition valve provided in the exhaust system of an internal combustion engine.

BACKGROUND ART

A reducing agent supply apparatus for supplying reducing agent to an exhaust gas purification catalyst provided in the exhaust system of an internal combustion engine has previously been known. Some reducing agent supply apparatuses have a reducing agent addition valve provided upstream of the exhaust gas purification catalyst in the exhaust system of the internal combustion engine. In this case, reducing agent can be supplied to the exhaust gas purification catalyst by injecting liquid reducing agent into the exhaust gas through the reducing agent addition valve.

Patent document 1 discloses an apparatus that diagnoses the above-described type of reducing agent supply apparatus having a reducing agent addition valve. The diagnosis apparatus according to patent document 1 has a temperature sensing unit that senses the temperature of the tip end portion of the reducing agent addition valve. The apparatus determines whether or not there is a malfunction in the reducing agent supply apparatus based on the temperature decrease of the tip end portion of the reducing agent addition valve as the reducing agent is supplied.

In this connection, the temperature decrease of the tip end portion of the reducing agent addition valve sensed by the temperature sensing unit in the diagnosis apparatus according to patent document 1 is caused by cooling of the tip end portion of the reducing agent addition valve, which is exposed to high temperature exhaust gas, by the reducing agent. Therefore, if the quantity of reducing agent injected through the reducing agent addition valve or the quantity of reducing agent passing by the tip end of the reducing agent addition valve decreases due to the occurrence of a malfunction, such as clogging of the reducing agent addition valve, in the reducing agent supply apparatus, the temperature decrease of the tip end portion will become smaller.

However, even when the reducing agent supply apparatus is in normal condition and the quantity of reducing agent passing by the tip end of the reducing agent addition valve is the same, a change in the temperature of the reducing agent itself may lead to a change in the temperature decrease of the tip end portion of the reducing agent addition valve during the supply of the reducing agent. For this reason, it is sometimes difficult to properly determine whether or not there is a malfunction in the reducing agent supply apparatus based on the temperature decrease of the tip end portion. In addition, mounting the temperature sensing unit on the tip end portion of the reducing agent addition valve may sometimes involve difficulties in achieving reliability in the reducing agent addition valve or due to its influences on the reducing agent injection characteristics.

Furthermore, in the case where the exhaust gas purification catalyst provided downstream of the reducing agent addition valve in the exhaust system of an internal combustion engine is a catalyst having an oxidizing ability, there is a known method of estimating the quantity of reducing agent added through the reducing agent addition valve based on the temperature rise of the exhaust gas purification catalyst caused as the reducing agent added through the reducing agent addition valve is oxidized in the exhaust gas purification catalyst. Whether or not there is a malfunction in the reducing agent supply apparatus can be determined based on the quantity of added reducing agent estimated by this method.

However, in some cases, no heat of the oxidation of reducing agent is generated in the exhaust gas purification catalyst, as is the case where the exhaust gas purification catalyst is an NOx selective reduction catalyst and urea is added as the reducing agent through the reducing agent addition valve. In such cases, it is difficult to determine whether or not there is a malfunction in the reducing agent supply apparatus by the above-described method.

PRIOR ART DOCUMENTS

[Patent Documents]

[Patent Document 1] Japanese Patent Application Laid-Open No. 2007-64112

[Patent Document 2] Japanese Patent Application Laid-Open No. 11-62686.

DISCLOSURE OF THE INVENTION

Problem to be Solved by the Invention

An object of the present invention is to provide a technology with which it is possible to determine, in an improved manner, whether or not there is a malfunction in a reducing agent supply apparatus equipped with a reducing agent addition valve provided in the exhaust system of an internal combustion engine.

Means for Solving the Problem

A reducing agent supply apparatus according to the present invention is equipped with a reducing agent addition valve provided in the exhaust system of an internal combustion engine. The reducing agent addition valve injects liquid reducing agent into the exhaust gas. In addition, whether or not there is a malfunction in the reducing agent supply apparatus is diagnosed based on the temperature decrease of the exhaust gas at a position through which the reducing agent passes as the reducing agent is injected through the reducing agent addition valve.

More specifically, a diagnosis apparatus for reducing agent supply apparatus according to the present invention is a diagnosis apparatus for reducing agent supply apparatus that diagnoses a reducing agent supply apparatus having a reducing agent addition valve that is provided in the exhaust system of an internal combustion engine and injects liquid reducing agent into the exhaust gas, characterized by comprising:

a temperature sensing unit that senses the temperature of the exhaust gas, provided at a position in the exhaust system of the internal combustion engine through which the reducing agent injected through said reducing agent addition valve passes;

a temperature decrease calculation unit that calculates the decrease in the temperature of the exhaust gas sensed by the temperature sensing unit as the reducing agent is injected through the reducing agent addition valve; and a diagnosis unit that diagnoses whether or not there is a malfunction in said reducing agent supply apparatus based on the decrease in the temperature of the exhaust gas calculated by the temperature decrease calculation unit.

As liquid reducing agent is injected through the reducing agent addition valve into the exhaust gas, the injected reducing agent evaporates. Then, the temperature of the portion of the exhaust gas through which the reducing agent passes decreases due to the heat of evaporation of the reducing agent. In addition, the larger the quantity of the reducing agent actually injected through the reducing agent addition valve is, the larger the temperature decrease of the exhaust gas due to the heat of evaporation of the reducing agent is.

Therefore, if the quantity of the reducing agent actually injected through the reducing agent addition valve decreases due to a malfunction occurring in the reducing agent supply apparatus, the temperature decrease of the exhaust gas at positions through which the reducing agent passes becomes smaller.

The temperature decrease of the exhaust gas due to the heat of evaporation of the reducing agent is much larger than the temperature decrease of the tip end portion of the reducing agent addition valve caused by cooling by the reducing agent in a liquid state as the reducing agent is injected. Therefore, the value of the temperature decrease of the exhaust gas due to the heat of evaporation of the reducing agent is practically irrelevant to the temperature of the liquid state reducing agent per se. Consequently, this value has a higher correlation with the quantity of the reducing agent actually injected through the reducing agent addition valve.

According to the present invention, whether or not there is a malfunction in the reducing agent supply apparatus can be determined even in cases where the reducing agent injected through the reducing agent addition valve is not oxidized in an exhaust gas purification catalyst provided in the exhaust system.

Therefore, according to the present invention whether or not there is a malfunction in the reducing agent supply apparatus can be determined more appropriately.

The temperature decrease calculation unit according to the present invention may calculate the decrease in the temperature of the exhaust gas that is caused due to the heat of evaporation of the reducing agent as the reducing agent is injected through the reducing agent addition valve.

In the present invention, an exhaust passage of the internal combustion engine may be provided with a recessed portion, and the reducing agent addition valve and the temperature sensing unit may be provided in the recessed portion.

In the case where the reducing agent addition valve and the temperature sensing unit are provided in the exhaust passage, the higher the flow velocity of the exhaust gas flowing in the exhaust passage is, the more the reducing agent injected through the reducing agent addition valve is prone to pass through the position at which the temperature sensing unit is provided, in a liquid state without being evaporated. In consequence, the decrease in the temperature of the exhaust gas sensed by the temperature sensing unit as the reducing agent is injected through the reducing agent addition valve may be affected by the flow velocity of the exhaust gas flowing in the exhaust passage.

On the other hand, in the case where the exhaust passage of the internal combustion engine is provided with a recessed portion, the flow velocity of the exhaust gas in the recessed portion is relatively stable. Therefore, in the case where the reducing agent addition valve and the temperature sensing unit are provided in the recessed portion, the reducing agent injected through the reducing agent addition valve passes through the position at which the temperature sensing unit is provided, in a state in which it has been evaporated by a proportion that is relatively stable. Consequently, the quantity of the reducing agent actually injected through the reducing agent addition valve and the decrease in the temperature of the exhaust gas sensed by the temperature sensing unit have a higher correlation.

Therefore, according to the above-described feature, whether or not there is a malfunction of the reducing agent supply apparatus can be determined more accurately.

In the present invention, the temperature sensing unit may be provided at a position at which spray of reducing agent is formed as the reducing agent is injected through the reducing agent addition valve.

In this case, a larger portion of the reducing agent injected through the reducing agent addition valve reaches the temperature sensing unit in a liquid state. Therefore, a larger quantity of reducing agent once adheres to the temperature sensing unit. Then, the reducing agent that has adhered to the temperature sensing unit evaporates on the temperature sensing unit. In consequence, the quantity of the reducing agent actually injected through the reducing agent addition valve and the decrease in the measurement value of the temperature sensing unit have a higher correlation.

Therefore, according to the above feature, whether or not there is a malfunction of the reducing agent supply apparatus can be determined more accurately.

In the present invention, an impingement diffusion member may be provided between the reducing agent addition valve and the temperature sensing unit in the exhaust system of the internal combustion engine. The impingement diffusion member is a member on which the reducing agent injected through the reducing agent addition valve is to impinge so as to be diffused.

With this feature, the reducing agent injected through the reducing agent addition valve impinges on and is diffused by the impingement diffusion member, whereby evaporation of the reducing agent is facilitated. Therefore, a larger quantity of reducing agent evaporates before it reaches the temperature sensing unit. In consequence, the decrease in the temperature of the exhaust gas sensed by the temperature sensing unit becomes larger. Therefore, whether or not there is a malfunction of the reducing agent supply apparatus can be determined more accurately.

In the present invention, the injection of the reducing agent by the reducing agent addition valve upon diagnosing whether or not there is a malfunction in the reducing agent supply apparatus by the diagnosis unit may be performed continuously for a specific period of time. In this case, the temperature decrease calculation unit may calculate the difference between the temperature of the exhaust gas at the time when the injection of the reducing agent by the reducing agent addition valve is started and the lowest value of the temperature of the exhaust gas during the specific period of time in which the injection of the reducing agent by the reducing agent addition valve is performed.

In the present invention, the diagnosis unit may determine that there is a malfunction in the reducing agent supply apparatus if the difference between the temperature decrease of the exhaust gas calculated by the temperature decrease calculation unit and a reference temperature decrease is larger than a threshold value at which it can be determined that the reducing agent supply apparatus is normal.

Here, the reference temperature decrease is the temperature decrease of the exhaust gas in the case where a quantity of reducing agent that should be injected through the reducing agent addition valve is actually injected. The reference temperature decrease can be calculated based on the operation state of the internal combustion engine at the time when the injection of the reducing agent through the reducing agent addition valve is performed etc.

The apparatus according to the present invention may further be provided with reducing agent injection quantity estimation unit that estimates the quantity of reducing agent actually injected through the reducing agent addition valve based on the temperature decrease of the exhaust gas calculated by the temperature decrease calculation unit. In this case, the diagnosis unit may determine that there is a malfunction in the reducing agent supply apparatus if the difference between a quantity of reducing agent that should be injected through the reducing agent addition valve and the quantity of reducing agent estimated by the reducing agent injection quantity estimation unit is larger than a threshold value at which it can be determined that the reducing agent supply apparatus is normal.

Advantageous Effect of the Invention

According to the present invention, whether or not there is a malfunction in a reducing agent supply apparatus having a reducing agent addition valve provided in the exhaust system of an internal combustion engine can be determined in an improved manner.

THE MODE FOR CARRYING OUT THE INVENTION

In the following, specific embodiments of the present invention will be described with reference to the drawings. The dimensions, materials, shapes and relative arrangements etc. of the components that will be described in connection with this embodiment are not intended to limit the technical scope of the present invention only to them, unless particularly specified.

Embodiment 1

(General Configuration of Internal Combustion Engine and Air-Intake and Exhaust System Thereof)

Figure 1:
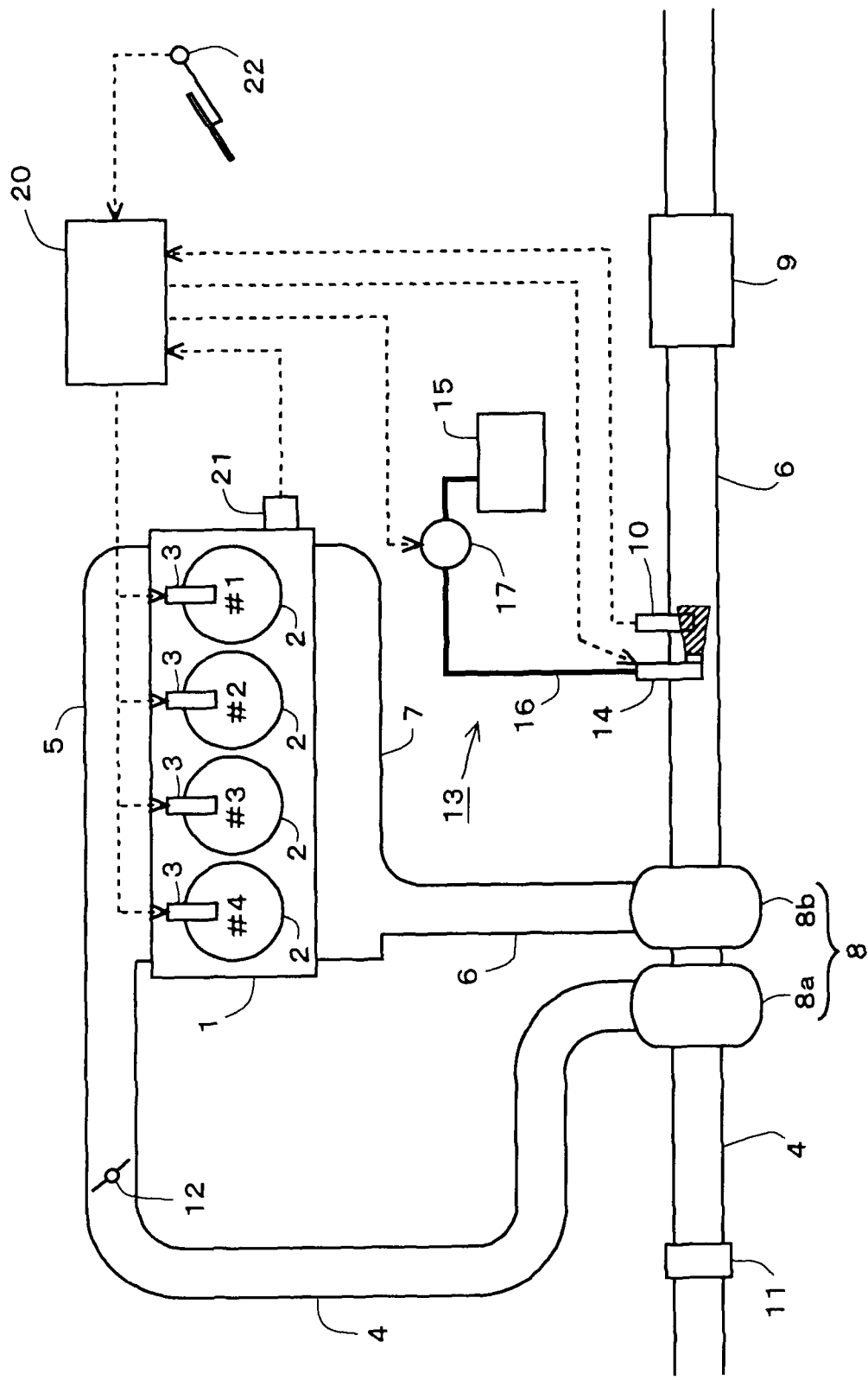
FIG. 1 is a diagram showing the general configuration of an internal combustion engine according embodiment 1 and its air-intake and exhaust system.

FIG. 1 is a diagram showing the general configuration of an internal combustion engine according to this embodiment and its air-intake and exhaust system. The internal combustion engine 1 is a diesel engine having four cylinders 2 for driving a vehicle. Each cylinder 2 is equipped with a fuel injection valve 3 that injects fuel directly into the cylinder 2.

The internal combustion engine 1 is connected with an intake manifold 5 and an exhaust manifold 7. One end of an intake passage 4 is connected to the intake manifold 5. One end of an exhaust passage 6 is connected to the exhaust manifold 7.

A compressor housing 8a of a turbocharger 8 is provided in the intake passage 4. A turbine housing 8b of the turbocharger 8 is provided in the exhaust passage 6.

An air flow meter 11 is provided in the intake passage 4 upstream of the compressor housing 8a. A throttle valve 12 is provided in the intake passage 4 downstream of the compressor housing 8a.

An NOx selective reduction catalyst 9 is provided in the exhaust passage 6 downstream of the turbine housing 8b. The NOx selective reduction catalyst 9 is a catalyst that selectively reduces NOx in the exhaust gas using ammonia as reducing agent.

In this embodiment, there is provided a urea supply apparatus 13 for supplying urea, which serves as a reducing agent, to the NOx selective reduction catalyst 9. The urea supply apparatus 13 includes a urea addition valve 14, a urea tank 15, a urea channel 16, and an electric pump 17.

The urea addition valve 14 is provided in the exhaust passage 6 downstream of the turbine housing 8b and upstream of the NOx selective reduction catalyst 9. One end of the urea channel 16 is connected to the urea addition valve 14. The other end of the urea channel 16 is connected to the urea tank 15. The electric pump 17 is provided in the urea channel 16.

The urea tank 15 contains urea solution. As the electric pump 17 operates, the urea solution contained in the urea tank 15 is supplied to the urea addition valve 14 through the urea channel 16. The urea addition valve 14 is provided with an injection port. The urea addition valve 14 injects the urea solution into the exhaust gas through the injection port, whereby urea is supplied to the NOx selective reduction catalyst 9.

The urea supplied to the NOx selective reduction catalyst 9 is once absorbed by the NOx selective reduction catalyst 9, and the absorbed urea is hydrolyzed to produce ammonia. The ammonia serves as reducing agent to reduce NOx in the exhaust gas.

In this embodiment, a temperature sensor 10 that senses the temperature of the exhaust gas is provided in the exhaust passage 6 downstream of and in the vicinity of the urea addition valve 14. The temperature sensor 10 is provided at a position at which spray of urea solution is formed as the urea solution is injected through the urea addition valve 14 (the sprayed urea solution being represented by the hatched portion in FIG. 1).

An electronic control unit (ECU) 20 is annexed to the internal combustion engine 1. The ECU 20 is a unit that controls the operation state of the internal combustion engine 1 etc. The ECU 20 is electrically connected with the air flow meter 11, the temperature sensor 10, a crank position sensor 21, and an accelerator opening degree sensor 22. The crank position sensor 21 senses the crank angle of the internal combustion engine 1. The accelerator opening degree sensor 22 senses the opening degree of the accelerator of the vehicle on which the internal combustion engine 1 is mounted. Output signals of the sensors are input to the ECU 20.

The ECU 20 is also electrically connected with the fuel injection valves 3, the urea addition valve 14, and the electric pump 17. They are controlled by the ECU 20.

(Method of Diagnosing the Urea Supply Apparatus)

When urea is supplied to the NOx selective reduction catalyst 9 in order to reduce NOx in the exhaust gas, the ECU 20 issues a command to the urea addition valve 14 to cause it to inject a specific quantity of urea solution for a specific period of time. The specific quantity and the specific period of time mentioned here are values determined based on, for example, experiments so that NOx in the exhaust gas can be reduced adequately.

However, if there is a malfunction in the urea supply apparatus 13 such as failure of the urea addition valve 14 or the electric pump 17 or clogging of the urea channel 16 at the time when the injection of urea solution through the urea addition valve 14 is performed in response to the command from the ECU 20, the quantity of urea solution that is actually injected through the urea addition valve 14 can sometimes be smaller than the specific quantity.

In this embodiment, a diagnosis of the urea supply apparatus 13 is performed in order to determine whether or not there is a malfunction like that described above in the urea supply apparatus. In the following, a method of diagnosing the urea supply apparatus according to this embodiment will be described.

As urea solution is injected into the exhaust gas through the urea addition valve 14, the injected urea solution evaporates. Then, the temperature of the portion of the exhaust gas through which the urea solution passes decreases due to the heat of evaporation of the urea solution. In addition, the larger the quantity of the urea solution actually injected through the urea addition valve 14 is, the larger the temperature decrease of the exhaust gas due to the heat of evaporation of the urea solution is.

Figure 2:
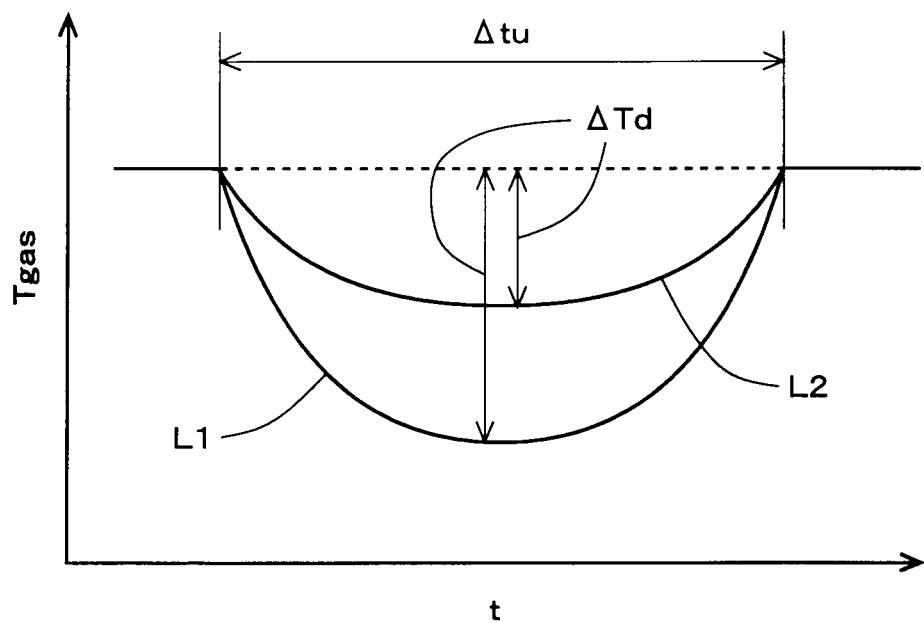
FIG. 2 is a graph showing changes in the measurement value of a temperature sensor while the injection of urea solution through a urea addition valve is performed, in embodiment 1.

FIG. 2 is a graph showing changes in the measurement value of the temperature sensor 10 while the injection of urea solution through the urea addition valve 14 is performed. In FIG. 2, the vertical axis represents the measurement value Tgas of the temperature sensor 10, and the horizontal axis represents the time t. The specific period of time over which the injection of urea solution through the urea addition valve 14 is performed is indicated by $\Delta tu$. Curve L1 is for a case where the urea supply apparatus 13 is normal, and curve L2 is for a case where there is a malfunction like that described above in the urea supply apparatus 13.

As shown in FIG. 2, if there is a malfunction in the urea supply apparatus 13 and the quantity of urea solution actually injected through the urea addition valve 14 is smaller than the specific quantity, the amount of decrease $\Delta Td$ in the measurement value of the temperature sensor 10 during the time in which the injection of urea solution through the urea injection valve 14 is performed becomes smaller as compared to that in the case where the urea supply apparatus 13 is normal.

As above, there is a correlation between the quantity of urea solution injected through the urea addition valve 14 and the temperature decrease of the exhaust gas caused at that time. In view of this, in this embodiment, the temperature decrease of the exhaust gas at the time when urea solution is injected through the urea addition valve 14 is calculated based on the measurement value of the temperature sensor 10, and whether or not there is a malfunction of the urea supply apparatus 13 is determined based on the calculated temperature decrease of the exhaust gas.

Figure 3:
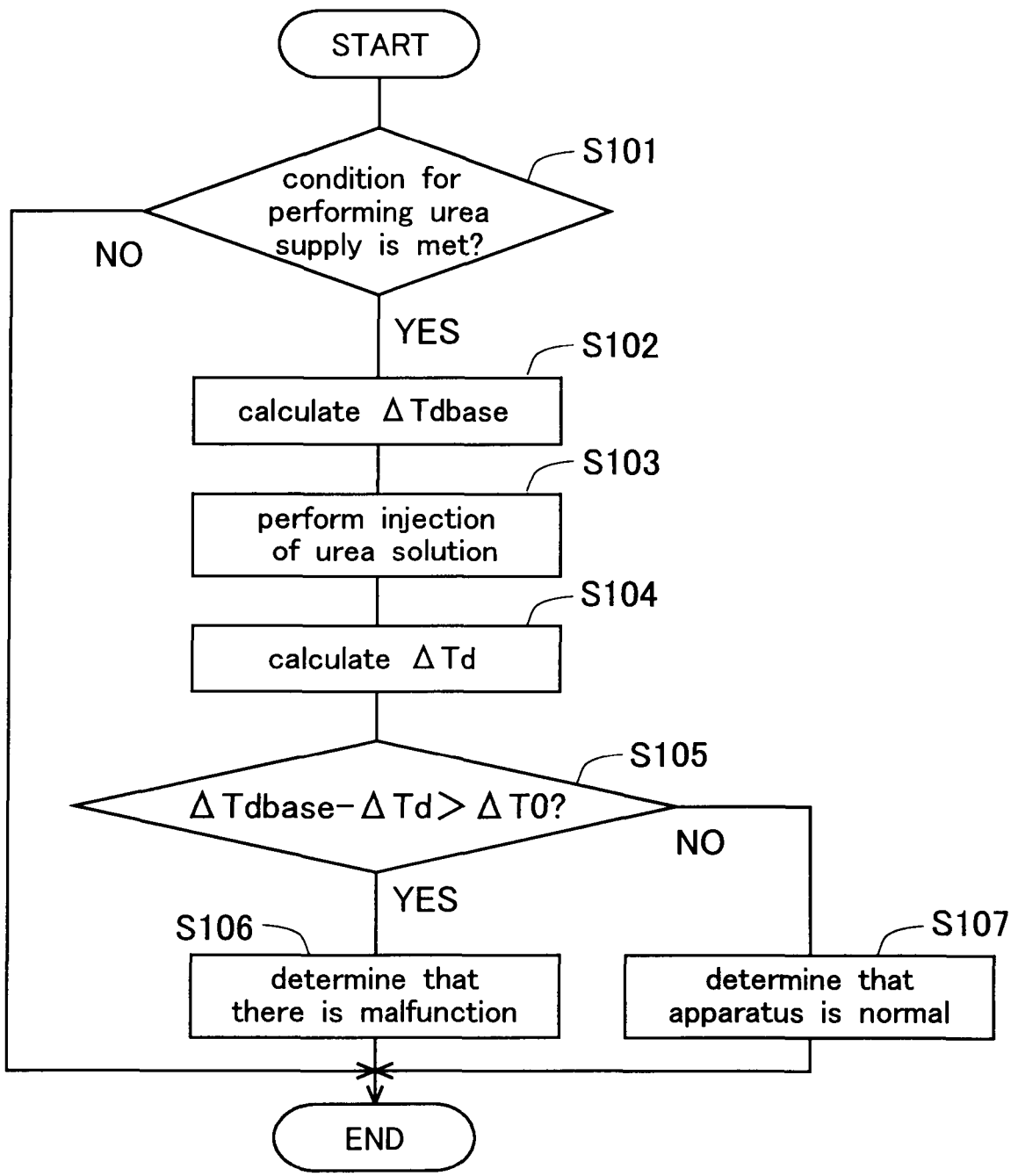
FIG. 3 is a flow chart showing a flow for diagnosing a urea supply apparatus, according to embodiment 1.

More specifically, the urea supply apparatus 13 is diagnosed by executing the flow shown in FIG. 3. FIG. 3 is a flow chart showing the flow for diagnosing the urea supply apparatus 13 according to this embodiment. This flow is stored in the ECU 20 in advance and executed repeatedly at predetermined intervals while the internal combustion engine 1 is running.

In this flow, first in step S101, the ECU 20 determines whether or not a predetermined condition for executing the supply of urea to the NOx selective reduction catalyst 9 is met. The supply of urea to the NOx selective reduction catalyst 9 by the urea supply apparatus 13 may be executed every time a specific time has elapsed, or every time the travel distance of the vehicle on which the internal combustion engine 1 is mounted reaches a specific distance. Alternatively, whether or not the condition for executing the supply of urea is met may be determined based on the history of the operation state of the internal combustion engine 1. If the determination in step S101 is affirmative, the ECU 20 proceeds to step S102, and if the determination is negative, the ECU 20 once terminates the execution of this flow.

In step S102, the ECU 20 calculates the temperature decrease $\Delta Tdbase$ of the exhaust gas at the position at which the temperature sensor 10 is disposed (which will be hereinafter referred to as the reference temperature decrease) under the assumption that the specific quantity of urea solution is actually injected through the urea addition valve 14. Here, the reference temperature decrease $\Delta Tdbase$ is calculated as the difference between the temperature of the exhaust gas at the time when the injection of urea solution through the urea addition valve 14 is started and the lowest value of the temperature of the exhaust gas during the period over which the injection of urea solution through the urea addition valve 14 is performed (i.e. during the specific period of time $\Delta tu$).

In step S102, the reference temperature decrease $\Delta Tdbase$ is calculated based on the operation state of the internal combustion engine 1. The relationship between the reference temperature decrease $\Delta Tdbase$ and the operation state of the internal combustion engine 1 can be obtained in advance based on, for example, experiments. The reference temperature decrease $\Delta Tdbase$ may be calculated taking into account the measurement value of the temperature sensor 10 at the time when the injection of urea solution through the urea addition valve 14 is started. Alternatively, the injection of urea solution through the urea addition valve 14 may be performed at a time when the urea supply apparatus 13 is in the initial state (i.e. at a time when the urea supply apparatus 13 is considered to be in a normal condition), and the reference temperature decrease $\Delta Tdbase$ may be determined based on the decrease in the measurement value of the temperature sensor 10 caused thereby.

Then, the EUC 20 proceeds to step S103, where it executes the injection of a specific quantity of urea solution through the urea addition valve 14 for the specific period of time $\Delta tu$. The ECU 20 memorizes measurement values of the temperature sensor 10 during the predetermined period of time $\Delta tu$.

Then, the ECU 20 proceeds to step S104, where it calculates the actual decrease $\Delta Td$ in the temperature of the exhaust gas at the position at which the temperature sensor 10 is disposed (which will be hereinafter referred to as the actual temperature decrease) during the specific period of time $\Delta tu$. Here, the actual temperature decrease $\Delta Td$ is calculated as the difference between the measurement value of the temperature sensor 10 at the time when the injection of urea solution through the urea addition valve 14 is started and the lowest value of the measurement values of the temperature sensor 10 during period over which the injection of urea solution through the urea addition valve 14 is performed (i.e. during the specific period of time $\Delta tu$).

Then, the ECU 20 proceeds to step S105, where it determines whether or not the value obtained by subtracting the actual temperature decrease ΔTd from the reference temperature decrease ΔTdbase is larger than a threshold value ΔT0, at which it may be concluded that the urea supply apparatus 13 is normal. The threshold value ΔT0 can be determined in advance based on, for example, experiments. If the determination in step S105 is affirmative, the ECU 20 proceeds to step S106, and if the determination is negative, the ECU 20 proceeds to step S107.

In step S106, the ECU 20 determines that there is a malfunction in the urea supply apparatus 13. Thereafter, the ECU 20 once terminates the execution of this routine. If it is determined that there is a malfunction in the urea supply apparatus 13, the driver of the vehicle on which the internal combustion engine 1 is mounted may be informed of the determination.

On the other hand, in step S107, the ECU 20 determines that the urea supply apparatus 13 is normal. Thereafter, the ECU 20 once terminates the execution of this routine.

According to this embodiment, whether or not there is a malfunction in the urea supply apparatus 13 is determined based on the temperature decrease of the exhaust gas due to the heat of evaporation of urea solution during the injection of urea solution by the urea addition valve 14. Therefore, whether or not there is a malfunction in the urea supply apparatus 13 can be determined with improved accuracy irrespective of the temperature of urea solution injected through the urea addition valve 14.

Furthermore, in the apparatus according to this embodiment, since the oxidation of urea does not occur in the NOx selective reduction catalyst 9, no rise in the temperature of the NOx selective reduction catalyst 9 or the exhaust gas is caused by the heat of oxidation. However, in this case, whether or not there is a malfunction in the urea supply apparatus 13 can be determined by the diagnosis method according to this embodiment.

In this embodiment, the temperature sensor 10 is disposed at a position at which spray of urea solution injected through the urea addition valve 14 is formed. Therefore, a larger portion of the urea solution injected through the urea addition valve 14 reaches and adheres to the temperature sensor 10, in a liquid state. The urea solution adhering to the temperature sensor 10 evaporates on the temperature sensor 10. Consequently, the quantity of urea solution that is actually injected through the urea addition valve 14 and the decrease in the measurement value of the temperature senor 10 (or the actual temperature decrease ΔTd) have a higher correlation.

Therefore, by disposing the temperature sensor 10 at the above-described position, whether or not there is a malfunction in the urea supply apparatus 13 can be determined with improved accuracy.

As urea solution is injected through the urea addition valve 14, and the urea solution evaporates, the temperature of the exhaust gas decreases at positions through which the urea solution or evaporated urea passes, even if spray of urea solution is not formed at these positions. Therefore, the temperature sensor 10 may be disposed at a position in the exhaust passage 6 through which the urea solution or evaporated urea passes, and it is not necessarily to be disposed at a position at which spray of urea solution is formed. Nonetheless, it is more preferred that the temperature sensor 10 be disposed at a position at which spray of urea solution is formed, as described above.

In the above-described flow for diagnosing the urea supply apparatus 13, the reference temperature decrease ΔTdbase and the actual temperature decrease ΔTd are calculated as the difference between the temperature of the exhaust gas at the time when the injection of urea solution through the urea addition valve 14 is started and the lowest value of the temperature of the exhaust gas during the specific period of time Δtu. However, these values may be calculated as the difference between the temperature of the exhaust gas at the time when the injection of urea solution through the urea addition valve 14 is started and the temperature of the exhaust gas at a specific timing during the specific period of time Δtu. Alternatively, these values may be calculated as the integrated value of the decrease in the temperature of the exhaust gas during the specific period of time Δtu.

In the above-described flow for diagnosing the urea supply apparatus 13, the diagnosis of the urea supply apparatus 13 is performed concurrently with the injection of urea solution through the urea addition valve 14 for supplying urea to the NOx selective reduction catalyst 9. However, the diagnosis of the urea supply apparatus 13 may be performed by injecting urea solution through the urea addition valve 14 for the purpose of diagnosing the urea supply apparatus 13 at a timing different from the supply of urea to the NOx selective reduction catalyst 9.

In this case, furthermore, the command value for the quantity of urea solution to be injected through the urea addition valve 14 may be set to a quantity larger than a specific quantity that is determined for the supply of urea to the NOx selective reduction catalyst 9. This makes the difference between the reference temperature decrease ΔTdbase and the actual temperature decrease ΔTd larger. Therefore, whether or not there is a malfunction in the urea supply apparatus 13 can be determined more accurately.

(Correspondences Between Components in this Embodiment and Components According to the Present Invention)

In this embodiment, the urea supply apparatus 13 corresponds to the reducing agent supply apparatus according to the present invention, and the urea addition valve 14 corresponds to the reducing agent addition valve according to the present invention. The reducing agent is not limited to urea, but any reducing agent that can be injected into the exhaust gas in a liquid state may be used. Furthermore, the NOx selective reduction catalyst 9 may be replaced by other exhaust gas purification catalyst (e.g. three-way catalyst, oxidation catalyst, or NOx storage reduction catalyst).

In the case where fuel is used as the reducing agent, a fuel addition valve is provided in place of the urea addition valve 14. In addition, a fuel supply apparatus is provided in place of the urea supply apparatus 13. The fuel supply apparatus includes a fuel addition valve, a fuel tank, a fuel channel that makes the fuel addition valve and the fuel tank in communication with each other, and a pump for feeding fuel from the fuel tank to the fuel addition valve through the fuel channel. In this case, the fuel supply apparatus corresponds to the reducing agent supply apparatus according to the present invention, and the fuel addition valve corresponds to the reducing agent addition valve according to the present invention. In this case, furthermore, a catalyst in which fuel functions as a reducing agent is provided as the exhaust gas purification catalyst in the exhaust passage 6.

In this embodiment, furthermore, the temperature sensor 10 corresponds to the temperature sensing unit according to the present invention.

In this embodiment, furthermore, the ECU 20 that executes step S104 in the flow for diagnosing the urea supply apparatus corresponds to the temperature decrease calculation unit according to the present invention.

In this embodiment, furthermore, the ECU 20 that executes steps S105 to S107 in the flow for diagnosing the urea supply apparatus corresponds to the diagnosis unit according to the present invention.

(Modification)

Figure 4:
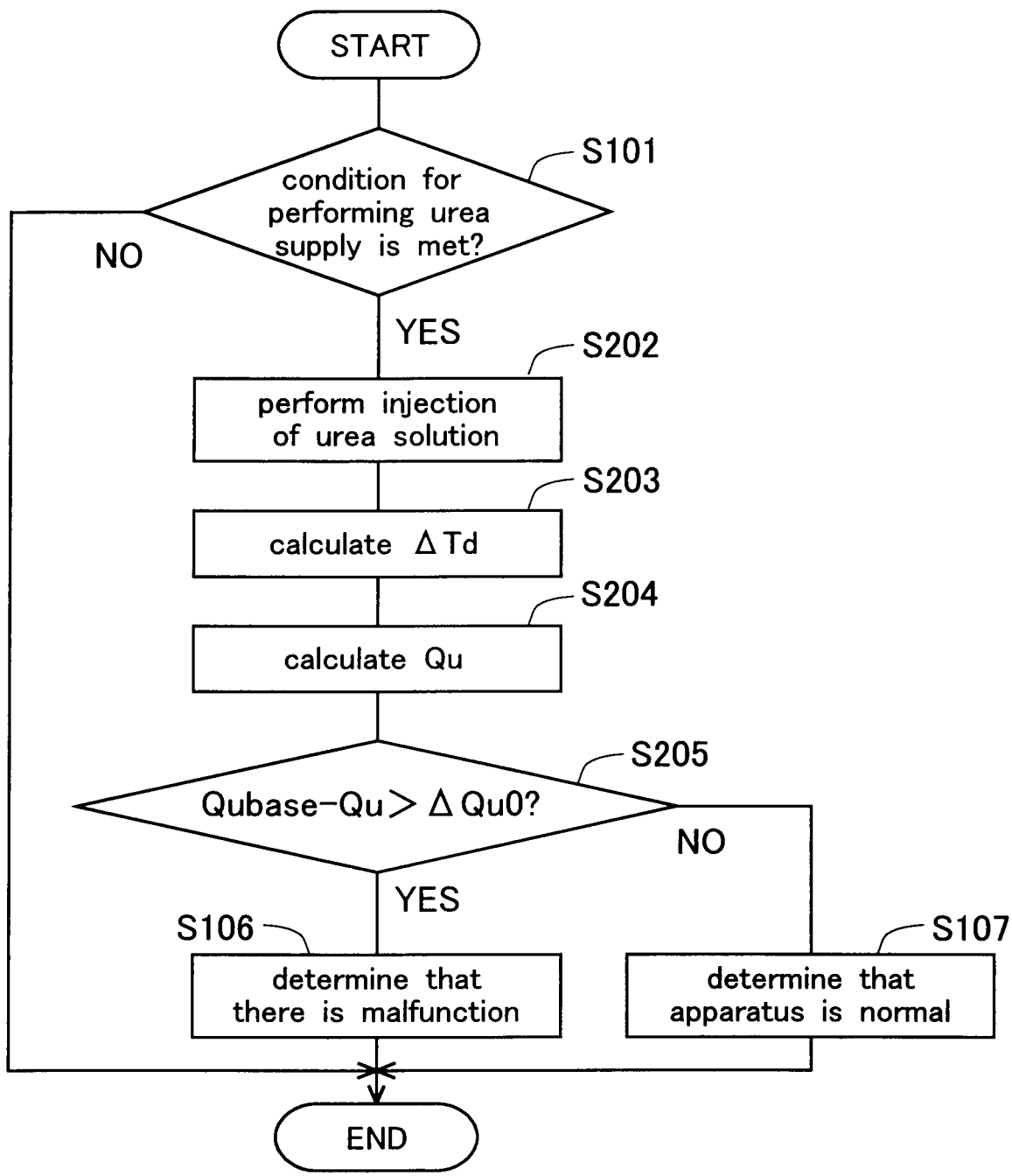
FIG. 4 is a flow chart showing a flow for diagnosing a urea supply apparatus, according to a modification of embodiment 1.

Here, a modification of this embodiment will be described. FIG. 4 is a flow chart showing a flow for diagnosing the urea supply apparatus 13 according to the modification. In this flow, steps S102 to S105 in the flow shown in FIG. 3 have been replaced by steps S202 to S205 respectively. Therefore, only the replacing steps will be described, and descriptions of the other steps will be omitted.

In this flow, if the determination in step S101 is affirmative, the ECU 20 proceeds to step S202. In step S202, the ECU 20 executes the injection of a specific quantity Qubase of urea solution through the urea addition valve 14 for a specific period of time Δtu. The ECU 20 memorizes measurement values of the temperature sensor 10 during the specific period of time Δtu.

Then, the ECU 20 proceeds to step S203, where it calculates the actual temperature decrease ΔTd. The content of this step S203 is the same as step S104 in the flow shown in FIG. 3.

Then, the ECU 20 proceeds to step S204, where it calculates the actual urea injection quantity Qu, or the quantity of urea solution actually injected through the urea addition valve 14 during the specific period of time Δtu, based on the operation state of the internal combustion engine 1 and the actual temperature decrease ΔTd. The relationship between the actual urea injection quantity Qu, the operation state of the internal combustion engine 1, and the actual temperature decrease ΔTd can be obtained in advance based on, for example, experiments.

Then, the ECU 20 proceeds to step S205, where it determines whether or not the value obtained by subtracting the actual urea injection quantity Qu from the specific quantity Qubase is larger than a specific threshold value ΔQu0 at which it can be concluded that the urea supply apparatus 13 is normal. The threshold value ΔQu0 can be determined in advance base on, for example, experiments. If the determination in step S205 is affirmative, the ECU 20 proceeds to step S106, and if the determination is negative, the ECU 20 proceeds to step S107.

By the diagnosis method according to this modification also, whether or not there is a malfunction in the urea supply apparatus 13 can be determined with improved accuracy.

(Correspondences Between Components in this Modification and Components According to the Present Invention)

In this modification, the ECU 20 that executes step S204 in the flow for diagnosing the urea supply apparatus corresponds to the reducing agent injection quantity estimation unit according to the present invention.

In this modification, furthermore, the ECU 20 that executes steps S205, S106, and S107 in the flow for diagnosing the urea supply apparatus corresponds to the diagnosis unit according to the present invention.

Embodiment 2

Here, only the feature that is different from embodiment 1 will be described. This embodiment differs from embodiment 1 in the general construction of the portion around the urea addition valve 14. The method of diagnosing the urea supply apparatus according to this embodiment is the same as that in embodiment 1.

(General Construction of the Portion Around the Urea Addition Valve)

Figure 5:
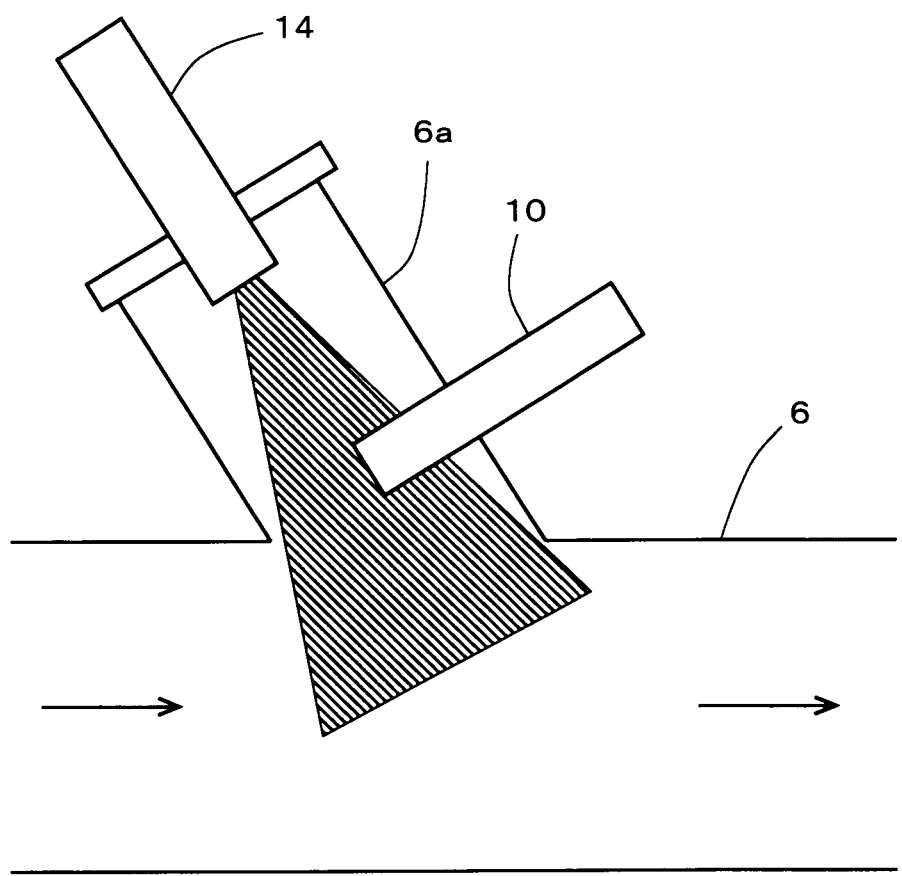
FIG. 5 is a diagram showing a general construction around a urea addition valve, according to embodiment 2.

FIG. 5 is a diagram showing the general construction of the portion around the urea addition valve 14 according to this embodiment. In this embodiment, the exhaust passage 6 is provided with a recessed portion 6a as shown in FIG. 5 at the position that corresponds to the portion at which the urea addition valve 14 is provided in FIG. 1. The arrows in FIG. 5 indicate the direction of flow of the main stream of the exhaust gas in the exhaust passage 6.

The urea addition valve 14 and the temperature sensor 10 are provided in the recessed portion 6a. The urea addition valve 14 provided in the recessed portion 6a injects urea solution toward the opening of the recessed portion 6a, namely toward the main stream of the exhaust gas in the exhaust passage 6. In addition, the temperature sensor 10 is disposed at a position in the recessed portion 6a at which spray of urea solution added by the urea addition valve 14 is formed (the sprayed urea solution being represented by the hatched portion in FIG. 5).

The flow velocity of the exhaust gas flowing in the exhaust passage 6 changes in accordance with the operation state of the internal combustion engine 1 etc. In the case where the urea addition valve 14 and the temperature sensor 10 are provided in the exhaust passage 6 as shown in FIG. 1, the higher the flow velocity of the exhaust gas flowing in the exhaust passage 6 is, the more the urea solution injected through the urea addition valve 14 is prone to pass through the position at which the temperature sensor 10 is provided in a liquid state without being evaporated. From this follows that the proportion of the urea solution that evaporates in the region from the urea addition valve 14 to the temperature sensor 10 and the proportion of the urea adhering to the temperature sensor 10 can change depending on the flow velocity of the exhaust gas flowing in the exhaust passage 6. In consequence, the decrease in the temperature of the exhaust gas sensed by the temperature sensor 10 as urea solution is injected through the urea addition valve 14 may be affected by the flow velocity of the exhaust gas flowing in the exhaust passage 6.

On the other hand, in the case of this embodiment, the change in the flow velocity of the exhaust gas in the recessed portion 6a is smaller than the change in the flow velocity of the main stream of the exhaust gas in the exhaust passage 6. Therefore, the proportion of the urea solution that evaporates in the region from the urea addition valve 14 to the temperature sensor 10 and the proportion of the urea adhering to the temperature sensor 10 are relatively stable. Consequently, the quantity of urea solution actually injected through the urea addition valve 14 and the decrease in the temperature of the exhaust gas sensed by the temperature senor 10 have a higher correlation.

Therefore, according to this embodiment, whether or not there is a malfunction of the urea supply apparatus 13 can be determined more accurately.

Embodiment 3

Here, only the feature that is different from embodiment 2 will be described. This embodiment differs from embodiment 2 in the general construction of the portion around the recessed portion 6a of the exhaust passage 6. The method of diagnosing the urea supply apparatus according to this embodiment is the same as that in embodiment 1.

(General Construction of the Portion Around the Recessed Portion)

Figure 6:
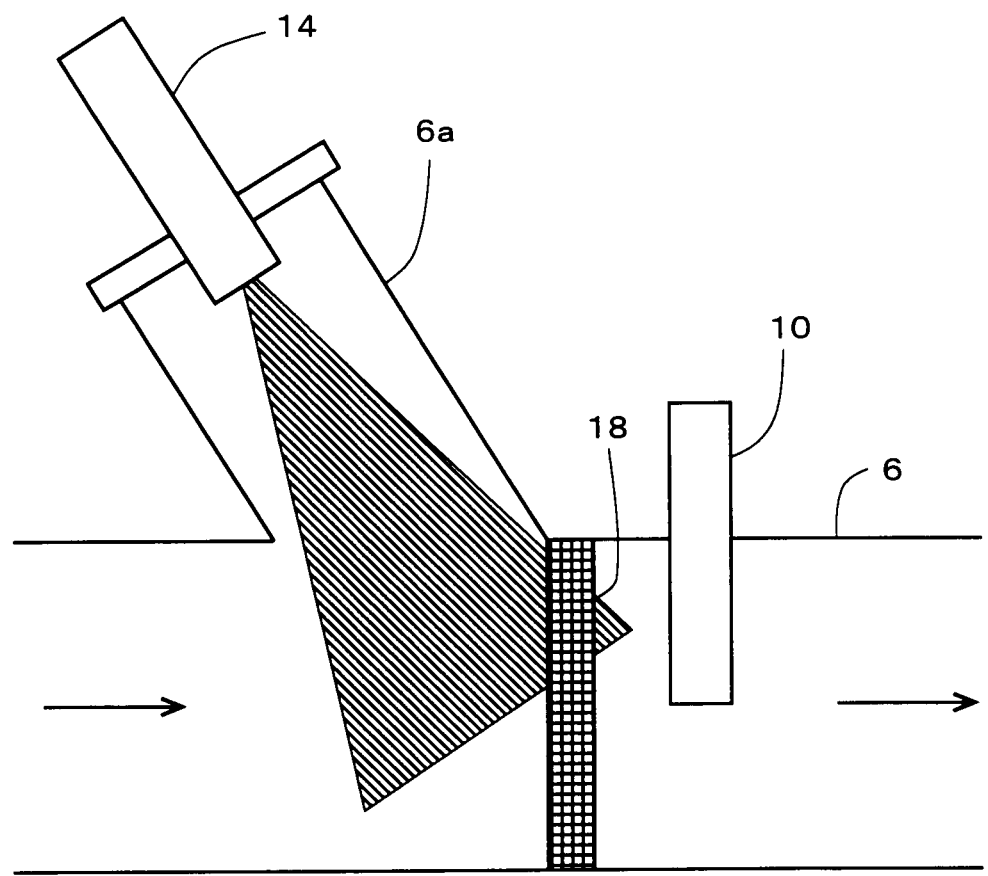
FIG. 6 is a diagram showing a general construction around a recessed portion, according to embodiment 3.

FIG. 6 is a diagram showing the general construction of the portion around the recessed portion 6a in this embodiment. In this embodiment, the exhaust passage 6 is provided with a recessed portion 6a, and the urea addition valve 14 is provided in the recessed portion 6a, as with embodiment 2. The arrows in FIG. 6 indicate the direction of flow of the main stream of the exhaust gas in the exhaust passage 6. The urea addition valve 14 provided in the recessed portion 6a injects urea solution toward the opening of the recessed portion 6a, namely toward the main stream of the exhaust gas in the exhaust passage 6.

A perforated metal 18 is provided immediately downstream of the opening of the recessed portion 6a in the exhaust passage 6. The perforated metal 18 is arranged transversely to the direction of flow of the main stream of the exhaust gas in the exhaust passage 6. The urea addition valve 14 and the perforated metal 18 are arranged in such a way that the spray of urea solution injected through the urea addition valve 14 impinges on the perforated metal 18 (the sprayed urea solution being represented by the hatched portion in FIG. 6).

The temperature sensor 10 is provided immediately downstream of the perforated metal 18 in the exhaust passage 6.

With the construction according to this embodiment, as the spray of urea solution injected through the urea addition valve 14 impinges on the perforated metal 18, diffusion of urea solution in the exhaust passage 6 is facilitated. Consequently, evaporation of urea solution is facilitated. Therefore, a larger portion of urea evaporates before it reaches the temperature sensor 10 disposed downstream of the perforated metal 18. In consequence, the decrease in the temperature of the exhaust gas sensed by the temperature sensor 10 at the time when urea solution is injected through the urea addition valve 14 becomes larger.

Therefore, according to this embodiment, whether or not there is a malfunction of the urea supply apparatus 13 can be determined more accurately.

In this embodiment, the urea addition valve 14 is not necessarily required to be provided in the recessed portion 6a. In other words, a perforated metal 18 may be provided between the urea addition valve 14 and the temperature sensor 10 in cases where the urea addition valve 14 and the temperature sensor 10 are provided in the exhaust passage 6 as with the configuration shown in FIG. 1. In this case also, the advantageous effect same as that described above can be achieved.
(Correspondences Between Components in this Embodiment and Components According to the Present Invention)

In this embodiment, the perforated metal 18 corresponds to the impingement diffusion member according to the present invention. The impingement diffusion member according to the present invention is not limited to the perforated metal, but it may be any member that is adapted to facilitate diffusion of urea solution as the spray of urea solution injected through the urea addition valve 14 impinges on it.

The embodiments described in the foregoing may be implemented in combination, where feasible.

DESCRIPTION OF THE REFERENCE SIGNS

1: internal combustion engine
2: cylinder
3: fuel injection valve
4: intake passage
5: intake manifold
6: exhaust passage
6a: recessed portion
7: exhaust manifold
8: turbocharger
8a: compressor housing
8b: turbine housing
9: NOx selective reduction catalyst
10: temperature sensor
11: air flow meter
12: throttle valve
13: urea supply apparatus
14: urea addition valve
15: urea tank
16: urea channel
17: electric pump 17
18: perforated metal
20: ECU
21: crank position sensor
22: accelerator opening degree sensor

The invention claimed is:

1. A diagnosis apparatus for a reducing agent supply apparatus that diagnoses a reducing agent supply apparatus having a reducing agent addition valve that is provided in an exhaust system of an internal combustion engine and injects liquid reducing agent into exhaust gas, comprising:
a temperature sensor that senses a temperature of the exhaust gas, provided at a position where spray of the reducing agent is formed as the reducing agent is injected through the reducing agent addition valve; and
an electronic control unit including logic that, when executed, causes the electronic control unit to perform steps of:
calculating a decrease in the temperature of the exhaust gas sensed by the temperature sensor as the reducing agent is injected through the reducing agent addition valve,
estimating a quantity of reducing agent actually injected through the reducing agent addition valve based on the decrease in the temperature of the exhaust gas calculated by the electronic control unit, and
diagnosing whether or not there is a malfunction in the reducing agent supply apparatus based on the quantity of reducing agent estimated by the electronic control unit,
wherein the electronic control unit determines that there is a malfunction in the reducing agent supply apparatus if the difference between a quantity of reducing agent that should be injected through the reducing agent addition valve and the quantity of reducing agent estimated by the electronic control unit is larger than a threshold value where the reducing agent supply apparatus is normal.

2. The diagnosis apparatus for the reducing agent supply apparatus according to claim 1, wherein the electronic control unit calculates the decrease in the temperature of the exhaust gas that is caused due to heat of evaporation of the reducing agent as the reducing agent is injected through the reducing agent addition valve.

3. The diagnosis apparatus for the reducing agent supply apparatus according to claim 1, wherein an exhaust passage of the internal combustion engine is provided with a recessed portion, and the reducing agent addition valve and the temperature sensor are provided in the recessed portion.

4. The diagnosis apparatus for the reducing agent supply apparatus according to claim 1, further comprising an impingement diffusion member that is provided between the reducing agent addition valve and the temperature sensor in the exhaust system of the internal combustion engine such that the reducing agent will impinge on and be diffused by the impingement diffusion member.

5. The diagnosis apparatus for the reducing agent supply apparatus according to claim 1, wherein the injection of the reducing agent by the reducing agent addition valve upon diagnosing whether or not there is a malfunction in the reducing agent supply apparatus by the electronic control unit is performed continuously for a specific period of time, and wherein the electronic control unit calculates the difference between the temperature of the exhaust gas at the time when the injection of the reducing agent by the reducing agent addition valve is started and the lowest value of the temperature of the exhaust gas during the specific period of time in which the injection of the reducing agent through the reducing agent addition valve is performed.

* * * * *